Patented May 25, 1937

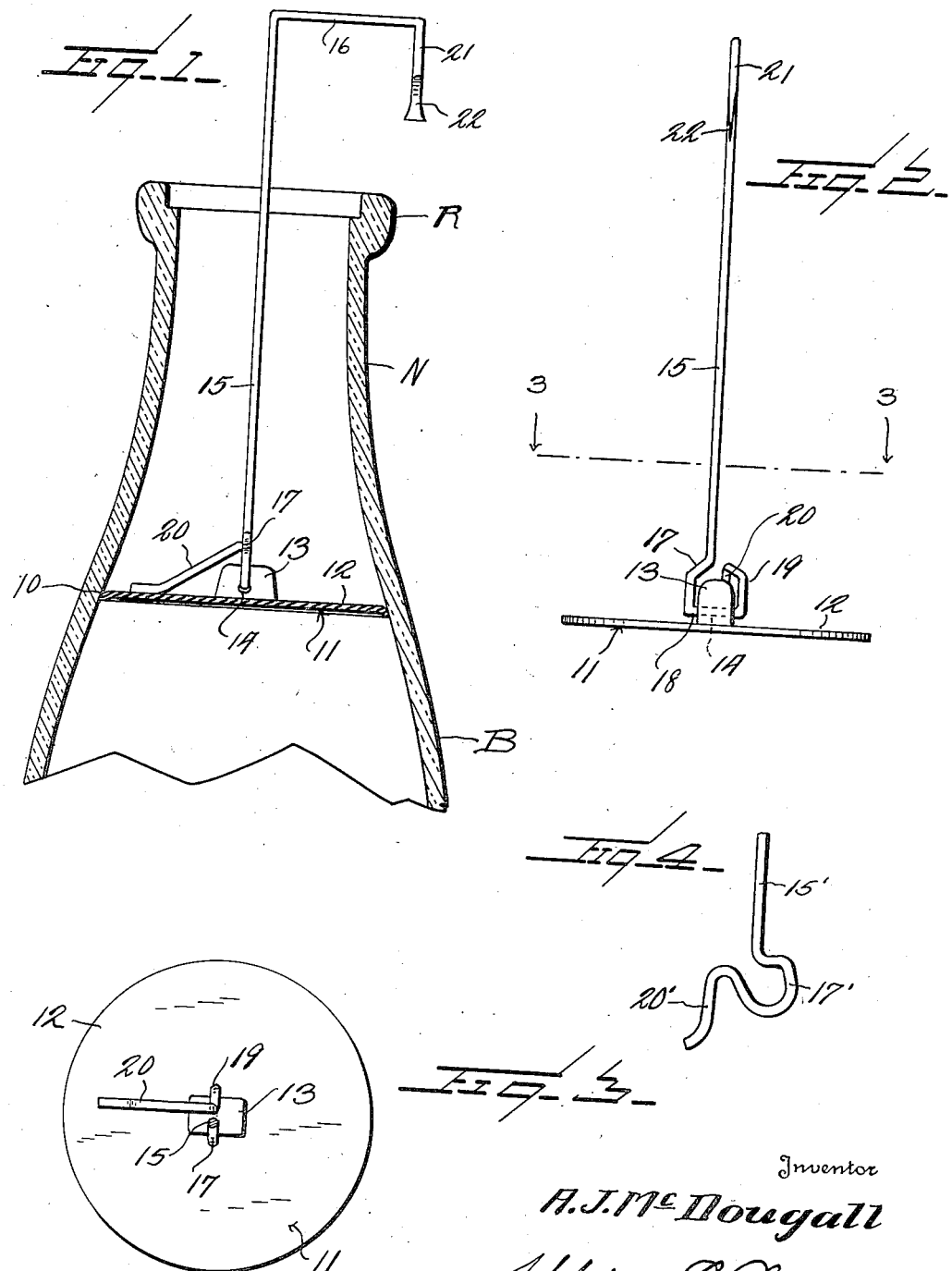

2,081,492

UNITED STATES PATENT OFFICE 2,081,492

CREAM SEPARATOR

Allan J. McDougall, Gaylord, Mich.

Application September 7, 1935, Serial No. 39,645

1 Claim. (Cl. 210—51.5)

This invention relates to liquid separating devices and more particularly to a separator adapted for separating the cream which has risen to the top of a bottle from the milk in the bottle.

An object of this invention is to provide a separating means in the form of a disc which may be readily inserted through the neck of the bottle, after the cap has been removed, and which is of a diameter substantially equal to that portion of the bottle at the cream line in the bottle so that the disc may be tightened from outside the bottle to prevent the milk from mixing with the cream when the bottle is tilted to pour the cream out.

A further object of this invention is to provide in a separating means of this kind, means whereby the disc may be readily released from the bottle and withdrawn without injury to the disc.

A still further object of this invention is to provide a device of this kind which is so constructed that after the cream has been poured out the device may, if desired, be left within the bottle and a sealing liquid in the form of water or the like placed on top of the disc.

The above and various other objects and advantages of this invention will in part be described in, and in part be understood from the following detail description of the present preferred embodiment, the same being illustrated in the accompanying drawing wherein:—

Figure 1 is a vertical section partly in detail of a device constructed according to an embodiment of this invention mounted in a milk bottle.

Figure 2 is a detail side elevation of the device.

Figure 3 is a sectional view taken on the line 3—3 of Figure 2.

Figure 4 is a fragmentary side elevation of a modified form of this device.

Referring to the drawing wherein like characters of reference designate corresponding parts throughout the several views, the letter B designates generally a bottle of the type used for dispensing milk or the like which has a neck N and a rim R at the top thereof, within which a conventional sealing cap or disc is adapted to be disposed.

When milk or like fluids are placed in the bottle B, the cream separating from the milk will rise to the top and be disposed within the neck portion N and the bottom of the cream will, as an example, be disposed along the line 10. It will, of course, be understood that this cream line 10 may be above or below the position indicated, depending upon the proportion of cream to the milk within the bottle.

In order to provide a means whereby the cream above the line 10 may be readily poured out without having the milk below the cream line 10 mixed with the cream, I have provided a separating member, generally designated as 11, in the form of a disc 12 of yieldable construction, the disc 12 being preferably formed of rubber or like yieldable material. The disc 12 is of a diameter substantially equal to the inside diameter of the bottle B at the cream line 10 and is provided with a centrally disposed upstanding lug 13 having a hole 14 extending therethrough at a point above the top surface of the disc 12.

An elongated rod 15 having a handle 16 at its upper end is provided with a loop 17 at its lower end, which engages in the hole 14 so that the handle 15 may be rocked with the hole 14 as a bearing. Preferably, the looped portion 17 has a straight portion 18 extending through the hole 14 so as to prevent tilting of the disc 12 in one direction with respect to the handle or rod 15. The rod 15 is formed preferably of relatively stiff wire and the loop 17 is continued to form an upwardly extending portion 19 and this extension 19 has a releasing arm 20 integral therewith and extending at substantially right angles to the straight lug engaging portion 18. This releasing arm 20 is adapted to have the free end thereof engage the upper surface of the disc 12 at a point adjacent the marginal portion of the disc 12 so that when the rod 15 is rocked, the outer portion of the disc 12 at one side will be pressed downwardly to release the vacuum formed after the cream has been poured out of the neck N.

The handle 16 may be continued to form an extension 21 which may be flattened, as at 22, so as to provide a tool or blade which may be used in the removal of the cap or disc disposed on the inside of the rim R of the bottle.

In the use of this cream separator, the cap or disc at the top or rim R of the bottle is first removed by either pulling up the usual tab provided on the cap or disc or, where such tab is not provided the blade 22 may be inserted in the marginal portion of the cap. The separating member 11 is then forced downwardly through the inside of the neck N which will cause a bending of the disc 12 without unduly disturbing or agitating the cream above the line 10.

The rod 15 is of a sufficient length so that the disc 12 may be initially disposed slightly below the cream line 10 and this disc 12 may preferably have a slightly greater diameter than the inside diameter of the bottle B at the cream line 10 so that the disc 12, when pulled upwardly, will be tightly engaged with the inside surface of the bottle. The separating member 11 will be substantially horizontal and may be maintained in a substantially horizontal position during the drawing up of the separator by means of the arm 20 which will hold the disc against tilting in at least one direction. When the disc 12, comprising the separator, has been tightly engaged with the inside of the bottle B at the cream line 10, the bottle B may be tilted and the cream poured out. This operation will be effected without mixing of any of the milk below the separator with the cream above the separator and, if desired, the device may be left in the bottle until it is desired to use the milk. The separator on being drawn up will form a partial vacuum and will thereby effectively seal the milk in the bottle below the separator and below the cream line but, if desired, the bottle may be further sealed by pouring water or other liquids on top of the separator so that no air will be permitted to enter the bottle below the separator and the partial vacuum below the separator will not gradually be released. In this manner the milk may be kept in the refrigerator in a sealed condition.

When it is desired to withdraw the separating member 11 from the inside of the bottle, this can be effected by merely rocking the rod 15 with the straight portion 18 as a fulcrum so as to cause the free end of the releasing arm 20 to press on the disc 12 adjacent the peripheral edge of the disc. This will cause a release of the engagement of the disc 12 with the inside of the bottle so that the disc can be drawn up in a position substantially parallel with the longitudinal axis of the bottle B.

It will be understood that the disc 12 will be bent during the withdrawing operation but as this bending is from opposed points, the disc will not be injured by reason of the narrowness of the neck N above the cream line 10.

This device is an exceedingly simple device which, by reason of its simple construction, can be manufactured relatively cheap and which, by reason of its construction, can be readily cleaned. It will also be understood that when the cream has been removed above the separator 11, the upper portion or neck of the bottle can be cleaned out, if desired, and this cleaning operation can be performed without diluting the milk or causing any of the cleaning means to mix with and thereby contaminate the milk.

In Figure 4 there is shown a modified form of this separator where the handle or rod 15' having a loop 17' at its lower end with which the disc or flexible separating member shown in Figures 1, 2, and 3 may be engaged. The form herein disclosed is provided with a disc releasing arm 20' which is disposed coplanar with the length of the rod 15' rather than at substantially right angles as is the releasing arm 20 in the preferred form. The disclosure shown in Figure 4 does not have the straight portion 18 as the loop 17' is formed on a continuous curve and the device locked within the opening provided in the disc which is a relatively large opening so as to permit the free rocking of the rod 15' in order to cause the releasing arm 20' to distort the disc and thereby release the disc from the interior of the bottle.

I claim:—

As a new article of manufacture, a cream separating means comprising a relatively flat flexible disc member, an upstanding lug integral with said member and disposed centrally thereof and provided with an opening therethrough parallel with the upper surface of the member, an elongated rod provided with a U-shaped loop at its lower end, the bight of the loop engaging in said opening and the free leg of the loop being disposed parallel with the length of the rod, and a laterally extending arm integral with the free leg of the loop, said arm extending outwardly and downwardly and terminating closely adjacent the peripheral edge of the disc member.

ALLAN J. McDOUGALL.